Patented Feb. 23, 1954

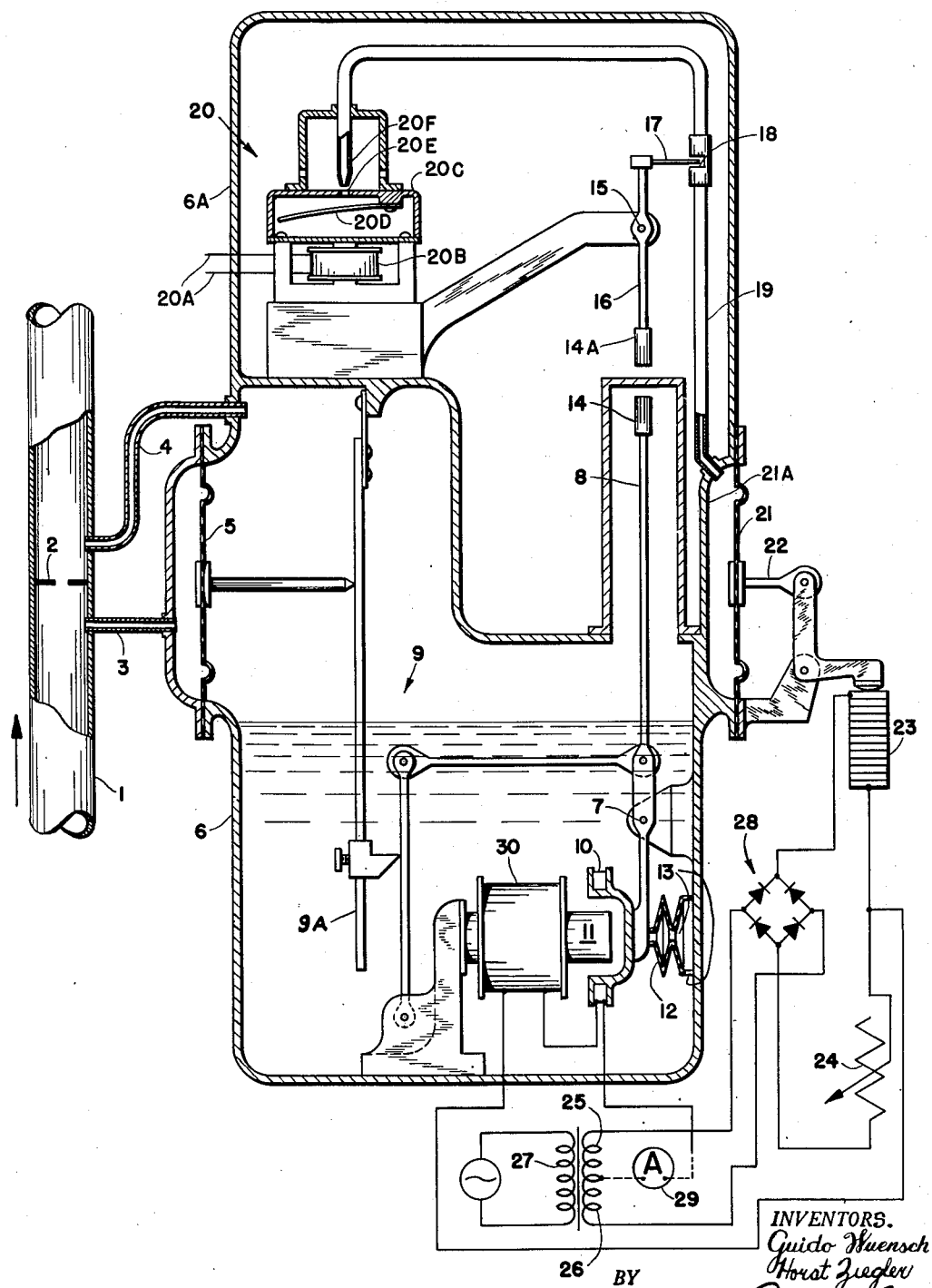

2,670,464

UNITED STATES PATENT OFFICE 2,670,464

MEASURING AND TRANSMITTING DEVICE FOR FLOW VELOCITIES AND THE LIKE

Guido Wünsch and Horst Ziegler, Berlin, Germany; said Wünsch assignor to Askania-Werke A.-G., a corporation of Germany Application October 17, 1950, Serial No. 190,453

Claims priority, application Germany October 29, 1949

3 Claims. (Cl. 340—187)

This invention relates to the measurement of fluid flows and the like. It relates particularly to a measuring device which is capable of electrically transmitting the measurement to a remote receiver. Such transmission facilitates the utilization of the measurement, which may consist in indicating or recording or integrating the measurement or in deriving a response therefrom for the control of the measured condition or of other conditions or operations. Still more specifically the invention relates to a self-compensating measuring and transmitting device, that is, a device wherein the measured force acts upon a sensitive lever and wherein the electric current obtained is not only transmitted to remote points but also used to compensate or counterbalance the lever moment of the measured force.

Heretofore such compensating lever instruments have been built which were sensitive and accurate but incapable of transmitting a current of appreciable energy except with the use of complicated, delicate and expensive amplifiers. On the other hand there have been compensating lever instruments which transmitted powerful currents, by direct action, but they were limited in application since they required high-powered measuring impulses.

The present instrument provides a novel transformation of impulse energies. The original measuring impulse, which may be extremely feeble at least part of the time, controls an intermediate fluid agency, which in turn controls an electric impulse the strength of which lies in a proper range for transmission to remote receivers.

The preferred intermediate fluid agency is a flow of air, usually at pressures of a few integral ounces per square inch. Such a flow can be controlled by most sensitive leverage. Its pressure can then control leverage of sufficient strength for the regulation of a substantial current. In other words it can receive and discharge measuring energy in the most flexible manner.

When air or some other compressible fluid is used the storage of successive increments of energy received is effected by the fluid medium itself. When oil or some other incompressible fluid is used such storage can be effected by the usual spring devices or the like, or sometimes by the electric device directly controlled by the fluid pressure, as shown in copending application S. N. 190,451, filed October 17, 1950.

A time lag is inherent in every form of energy storage in a fluid medium or equivalent thereof. Heretofore, when the pneumatic method was used for the transmission of measurements this time lag constituted one of the most serious limitations of the method. In the present case the situation is different. The pneumatic method is used only for extremely short-ranged transmission, within a small instrument; it serves as a transformer rather than as a transmitter. Therefore it involves no appreciable friction loss due to length of transmission line; it requires no excess pressure to minimize such loss, and employs pressure at much lower levels than are used in typical transmitters. At such levels the time lag is minute, like that required in any event for the dampening of oscillations in mechanical leverage and the like.

By means of this novel impulse transformation it is possible to safely and economically obtain electric impulses suitable for transmission from a sealed instrument which requires no service. This instrument might be compared with a telephone transmitter, with regard to its operating principle and its combined accuracy and reliability.

The nature and advantages of the new instrument will be more readily understood when the detailed description and illustration of a basic embodiment has been studied. Such an embodiment is illustrated in the drawing appended hereto, which shows the device in a schematic, cross-sectional elevation.

A gas conduit 1 has an orifice 2 interposed thereon. Piezometric ducts 3 and 4, preferably as short as possible, connect portions of conduit 1, upstream and downstream of the orifice respectively, with separate gas-filled spaces on the two sides of a flexible diaphragm 5 in a closed pressure chamber or housing 6.

This housing also provides on its inside a bearing 7 for a main lever 8. The lever is actuated by the diaphragm 5 through linkage 9 which preferably includes a long, adjustable link 9-A. In order to compensate the forces transmitted by the linkage the main lever 8 carries the movable coil 10 of an electro-dynamic system. The stationary, soft magnetic core 11 of this system projects partly into the movable coil 10.

A damping or dash-pot device, such as a bellows 12 secured to the inside wall of housing 6, has its free end connected with the lever 8. The inside of the bellows communicates with the surrounding part of housing 6 through small openings 13. It is well known to use such a device to suppress undesirable overtravel of a measuring lever, which might be caused for instance by momentary surges in the gas line, or by the operation of an off-on switch (not shown) in the circuit of coil 10. In the present instrument the dash-pot 12 serves additionally, or exclusively, to compensate for a slight time lag inherent in the intermediate, pneumatic transmission, as will be seen presently.

In order to regulate the intermediate force between the original impulse of diaphragm 5 and the circuit for the electric transmitting and compensating system, we install a permanent magnet 14 on the main lever 8 in chamber 6. Opposite this magnet we provide a follower 14-A of soft or hard magnetic material, located in a closed chamber 6-A filled with air and separated from the gas-filled chamber 6. Within the air chamber 6-A we provide a bearing 15 for a secondary lever 16, carrying the follower 14-A at one end and a small vane 17 at the other. This vane plays in front of a receiver nozzle 18 in a low pressure air line 19. It regulates the intermediate, pneumatic force, in accordance with the principal measurement at 5.

An extremely low but definite air pressure, such as a few ounces or sometimes fractional ounces per square inch, is generated by a compressor or blower 20 in chamber 6-A, shown as and preferably consisting in a magnetic vibrator. Such a device, as known from copending application S. N. 191,958, filed October 25, 1950, may comprise a circuit 20-A for alternating current, having predetermined phase and frequency characteristics as usual; an electric magnet 20-B in this circuit; a closed housing 20-C adjacent the magnet; a resilient magnetic membrane 20-D in the housing, opposite the magnet; a small opening 20-E in the wall of the housing on one side of the membrane; and an air intake nozzle 20-F disposed opposite the opening, outside the housing, and connected with line 19.

The low but positive air pressure generated by the magnetic vibrator compressor 20 and controlled by the vane 17 actuates a diaphragm 21, in a closed chamber 21-A at the end of line 19. The diaphragm area is made large enough for the required amplification of the auxiliary force. The diaphragm chamber is made flat as may be practical, in order to minimize the volume to be filled up with air and the time lag inherent therein. Such air as is deflected from nozzle 18 by vane 17 remains within the closed chamber 6-A. It will ultimately re-enter the vibrator housing 20-C through opening 20-E and be projected into the intake 20-F again, in repetitive cycles. The system is simple; for instance, no purification of the circulating air is usually required. Loss as well as pollution of the air or other pneumatic medium is prevented by keeping the air compartment 6-A closed and hermetically sealed, except to the nozzles 18, blower 20 and air receiver 21-A.

Diaphragm 21, by leverage 22, applies pressure to a compression carbon rheostat or carbon pile 23 for the ultimate control of the electric current to be transmitted. A Wheatstone bridge is formed, having carbon rheostat 23 as variable resistor arm, in parallel with a normally fixed resistor 24. The bridge is completed by partial coils 25, 26 forming together the secondary winding of a centrally tapped transformer 27; a rectifier 28 being interposed between partial coils 25, 26 and resistors 23, 24. The diagonal of the bridge forms the control circuit. It has interposed thereon, in series, an ampere meter 29, the movable coil 10, and a cooperating stationary coil 30 around the magnet core 11 in chamber 6. The coils 10 and 30 form an electrodynamic couple compensating the impulse of diaphragm 5. The ampere meter 29 can be located remotely from the other parts.

The lower part of the housing 6, below the measuring diaphragm 5, can be filled with oil, as shown. This will aid in the dash-pot action of unit 12, and protect the coils 10, 30 from corrosion by contact with gas.

In operation a flow of gas passes through conduit 1. A pressure differential is derived by orifice 2 and applied to diaphragm 5. A high flow velocity tends to produce a high differential and to move diaphragm 5, link 9-A, main lever 8 above bearing 7 and follower 16 below bearing 15 to the right, to withdraw vane 17 from nozzle 18, thereby to increase the air pressure on diaphragm 21, to move it to the right and through linkage 22 to compress carbon pile 23. As such compression begins it reduces the resistance in the variable arm 23 of the Wheatstone bridge 23, 24, 25, 26, increases the density of current flowing through the indicator 29 and compensator 10, 30, and produces an increased compensating force—as shown, a repulsion between coils 10 and 30, tending to move coil 10 and the lower part of lever 8 to the right. When a certain compression of the carbon pile 23 has been reached the repulsion between coils 10 and 30 reestablishes equilibrium on the main lever 8.

In this manner each velocity in conduit 1 is made to correspond with a certain position of main lever 8 and of ampere-meter-indicator 29.

The position of the ampere-meter can serve as a direct indication of the flow velocity in conduit 1. The force of electro-magnetic repulsion between coils 10 and 30 is proportional to the square of the current density in the neutral conductor of the bridge, just as the pressure differential at orifice 2 is proportional to the square of the flow velocity in conduit 1.

For the calibration and adjustment of the indicator 29 we may use the mechanical adjustment at 9-A or a variation of rheostat 24, or both.

Each velocity in conduit 1 corresponds with a certain position of lever 16, vane 17 and carbon pile compressor linkage 22. However, it is unnecessary to separately calibrate these parts, or even the main lever 8. The forces indicated by elements 5 and 29 are self-compensating.

Due to the extremely low pressures used in the intermediate system none of the parts of this system is subject to any appreciable wear and tear. Delicate elements such as electric contact points or electronic valve tubes are eliminated. Even the highest pressures on diaphragm 5, proportional to the square of the high flow velocity, will create only light reactions in the pneumatic and electric systems. The range of auxiliary air pressures can be selected with prime reference to the requirements of the carbon pile 23 directly controlled thereby. Suitable carbon piles or systems thereof can be selected which allow the use of an air pressure, generated at 20, in the range between a small fraction of an ounce and about 8 or 10 ounces per square inch.

A further advantage of the extremely low air pressures is that practically no friction load is imposed on vane 17, so that even an exceedingly small impulse from diagraph 5, proportional to the square of a very low, fractional flow velocity is able to start the operation of the vane, as required for compensation and reestablished equilibrium. Accordingly, the range of the instrument is extremely wide. It is possible with very moderate cost to make the auxiliary system 14, 14-A, 17, 21, 23 much more accurate than a recording, integrating or controlling receiver 29 can be.

It is true that the low pressure of the auxiliary pneumatic force requires amplification by a relatively large receiver diaphragm 21, in order to yield a sufficient mechanical force for the complete compression of the carbon pile 23, at maximum flow velocity. No serious expense or difficulty is usually involved in the use of such relatively large diaphragms.

There is a slight time lag between the original measuring impulse by diaphragm 5 and leverage 9 and the compensation thereof by magnets 10, 30. This is due to the fact that some time is required to vary the air pressure in chamber 21-A; for instance to fill this chamber with the required number of increments of air pressure, produced by vibrations of generator 20. The time lag is exceedingly small, since the total volume of the air space confined in duct 19 and chamber 21-A is minute, and the succession of air waves generated at 20 is rapid. Nevertheless, since the original measuring impulse in some instances may be rapid, it is preferably dampened by the dash-pot 12, 13. In this manner the movable parts 8, 16, 22, 29 etc. are caused to assume new positions without objectionable fluctuations, whether the original impulses at 5 be sudden or gradual. Such dampening is usually desirable also for readability of the indicator 29, quite aside from inherent requirements of the auxiliary system 20, 18, 21-A.

A single embodiment has been described, but persons skilled in the art of instrumentation will understand, upon a study of the principles outlined, that the device can be varied in many respects.

The quantity measured or condition determined and remotely reflected is not necessarily a differential pressure. It may be another type of pressure, a temperature or some other condition, either of a gas or of some other fluid or substance. The new instrument is particularly useful in instances where the range of forces to be measured is wide, and full accuracy is required throughout the range. Heretofore, attempts to utilize an auxiliary force have often limited the range of full accuracy. In the new instrument there is no such limitation. The only limitation on its range of application is that which is inherent in any given primary element such as diaphragm 5, which can be matched by the compensating elements 10, 30, and by the leverage and other cooperating parts.

Likewise, the ultimate receiver is not necessarily an ampere-meter or indicator with or without recording, integrating or controlling attachments. It may consist in any device directly or indirectly controllable by the electric current flowing in the circuit which includes the coils 10 and 30. In the embodiment shown the lever 8 has two arms. The electromagnet 10, 11 forms an electrodynamic system with coil 30 and has its coil 10 secured to the lever, by a rigid correction thereto. The fluid circuit 18, 19, 20, 21 uses stationary discharge and receiver nozzles 18 and a movable vane 17. The electric circuit 10, 29 is controlled by resistance modulation, at 23. In all these and other respects modifications are possible.

Finally the intermediate transmission and other cooperating means are not necessarily those shown. Various modifications will occur to persons skilled in the art. We claim:

1. In an instrument for determining a condition and remotely reflecting it, a condition-responsive device; an electro-magnet; a lever fulcrumed for shifting by the condition-responsive device and for compensatory shifting by the electro-magnet; means forming an electric Wheatstone bridge circuit, with the coil of the electro-magnet in series with a remote receiver in the diagonal of the bridge; and means forming an auxiliary fluid circuit, comprising low pressure air-blower means to continuously maintain an air jet, a jet receiver nozzle opposite the jet, a vane movable by said lever to cut into the air jet in front of the jet receiver nozzle and thereby to direct variable portions of the low pressure of the air jet into the jet receiver nozzle, a low pressure diaphragm device connected with the jet receiver nozzle to be shifted by variable air pressures therein, and a compression rheostat in one arm of said Wheatstone bridge circuit, said compression rheostat being arranged for compression by the diaphragm device; whereby impulses in the condition-responsive device instantly produce corresponding shifts of the lever, vane, diaphragm device, compression rheostat, bridge circuit and electro-magnet, the electro-magnet rebalancing the lever and the remote receiver in series with the electro-magnet reflecting the impulses.

2. An instrument according to claim 1 additionally comprising a hermetically sealed air chamber containing the jet receiver nozzle and communicating with the low pressure air blower and with the diaphragm device; said lever being located outside the air chamber and said vane forming a second lever inside the air chamber and being operable in the plane of the first lever; a small permanent magnet mounted on one of the two levers; and a small magnetic body forming part of the other lever and being separated from the permanent magnet by a small gap across the wall of the air chamber.

3. An instrument according to claim 1 wherein the air blower is of the electric vibrator type.

GUIDO WÜNSCH.
HORST ZIEGLER.

References Cited in the file of this patent

UNITED STATES PATENTS

| Number | Name | Date |
| --- | --- | --- |
| 1,638,101 | Roucka | Aug. 9, 1927 |
| 1,953,819 | Payne | Apr. 3, 1934 |
| 2,131,486 | Spitzglass | Sept. 27, 1938 |
| 2,319,363 | Wunsch et al. | May 18, 1943 |
| 2,371,040 | Fisher et al. | Mar. 6, 1945 |
| 2,397,448 | Todd | Mar. 26, 1946 |

FOREIGN PATENTS

| Number | Country | Date |
| --- | --- | --- |
| 458,823 | Great Britain | Dec. 28, 1936 |
| 813,987 | Germany | Sept. 17, 1951 |